United States Patent [19]
Takatori et al.

[11] Patent Number: 5,633,988
[45] Date of Patent: May 27, 1997

[54] ADAPTATION METHOD FOR DATA PROCESSING SYSTEM

[75] Inventors: Sunao Takatori; Ryohei Kumagai; Koji Matsumoto; Makoto Yamamoto, all of Tokyo, Japan

[73] Assignee: Yozan Inc., Tokyo, Japan

[21] Appl. No.: 989,503

[22] Filed: Dec. 10, 1992

Related U.S. Application Data

[63] Continuation of Ser. No. 528,319, May 25, 1990, abandoned.

[30] Foreign Application Priority Data

| | | | |
|---|---|---|---|
| Jun. 2, 1989 | [JP] | Japan | 1-140834 |
| Jul. 3, 1989 | [JP] | Japan | 1-171704 |
| Jul. 12, 1989 | [JP] | Japan | 1-179658 |
| Sep. 29, 1989 | [JP] | Japan | 1-254712 |
| Sep. 29, 1989 | [JP] | Japan | 1-254713 |
| Sep. 29, 1989 | [JP] | Japan | 1-254714 |

[51] Int. Cl.$^6$ ............ G06F 7/16; G06F 15/18
[52] U.S. Cl. .................... 395/23; 395/20
[58] Field of Search ................ 395/23, 26, 20

[56] References Cited

U.S. PATENT DOCUMENTS

| | | | |
|---|---|---|---|
| 3,310,784 | 3/1967 | Hilinski | 364/513 |
| 3,602,731 | 8/1971 | Yanai | 364/513 |
| 3,638,196 | 1/1972 | Nishiyama | 364/513 |
| 3,979,602 | 9/1976 | Reible | 307/277 |
| 4,535,785 | 8/1985 | VandenHonert et al. | 128/746 |
| 4,912,655 | 3/1990 | Wood | 364/900 |
| 4,988,891 | 1/1991 | Mashiko | 395/25 |
| 5,040,230 | 8/1991 | Takatori et al. | 364/807 |

OTHER PUBLICATIONS

VLSI Architectures for Neural Networks, Treleaven et al., IEEE Micro, 1989.
Neural Computing–Theory and Practice, Philip D. Wasserman, 1989.
An Introduction to Computing With Neural Nets, Richard P. Lippmann, IEEE Assp Mag., Apr. 1987.
Neural 'selective' Processing and Learning, Patrice Gelb and Edison Tse, IEEE Inter. Conf. on Neural Networks, Jul. 1988, pp. I–417 to I–424.
"VLSI Architectures for Neural Networks", Treleaven et al, IEEE Micro, 1989.

*Primary Examiner*—George B. Davis
*Attorney, Agent, or Firm*—Cushman, Darby & Cushman IP Group of Pillsbury Madison & Sutro LLP

[57] ABSTRACT

An adaptation method for a data processing system comprising a plurality of neurons each of which outputs an output according to a comparison between a sum of multiplied inputs by weights and a threshold, characterized in the threshold of the neuron which has generated significant output at certain point of time is compulsorily increased to a maximal value and the weight of the neuron is adapted for a constant value of the inputs wherein the threshold is decreased to a value at the point.

21 Claims, 11 Drawing Sheets

*Fig. 35*
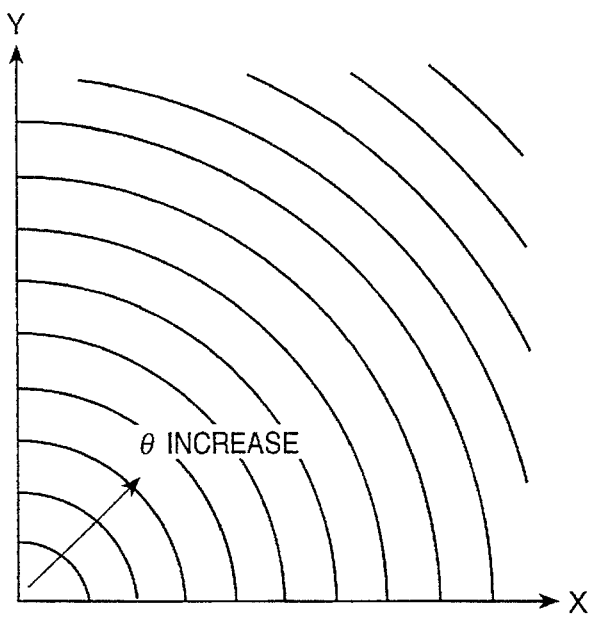
*Fig. 36*
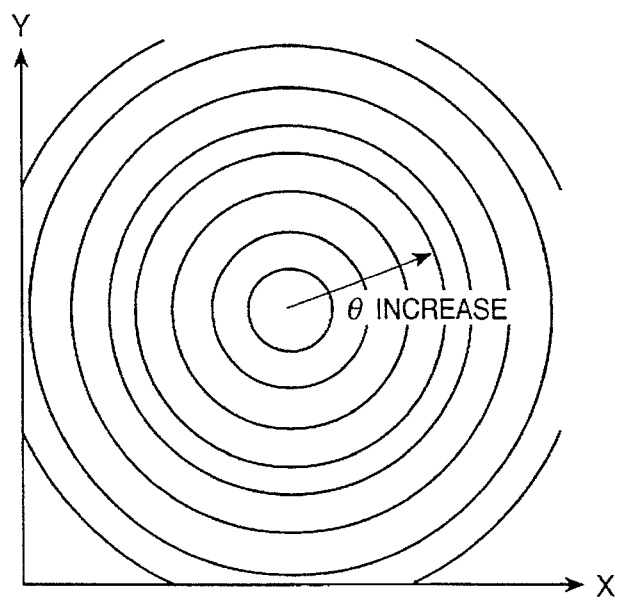
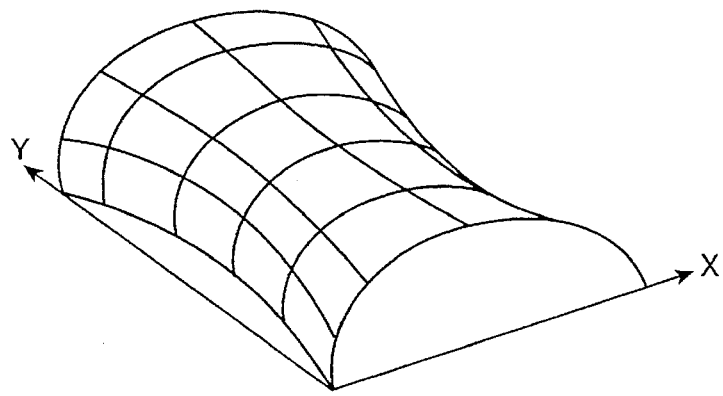
*Fig. 37*

ADAPTATION METHOD FOR DATA PROCESSING SYSTEM

This is a continuation of application Ser. No. 07/528,319, filed on May 25, 1990, now abandoned.

FIELD OF THE INVENTION

The present invention relates to method for adapting weights of a data processing system comprising a plurality of neurons which outputs data according to the comparison results between sum of multiplied input data by the weight and threshold.

PRIOR ART

In a learning process of data processing system of this type, when an adequate input and output correlation at a certain level occurs and the correlation is strengthened, the data processing system cannot escape from the condition. As a result, further adaptation becomes impossible. This phenomenon is expressed by "fall into local minimum". Bolzman machines (David H. Ackley, Geoffrey E. Hinton, and Terrence J. Sejnowski: A learning algorithm for Bolzman machines: Cognitive Science 9, 1989, 147–169), for example, focus on an energy formula of a neural network;

$$E = -\sum_{i<j} wijSiSj + \sum_{i} \theta iSi \qquad (1)$$

This energy is jumped temporarily to a predetermined high level so as to escape from a local minimum of the above energy formula and reach a global minimum. However, optimized correlation of a input and output and the condition of global minimum of said energy do not always coincide with each other. In general, since the depth of a local minimum is unknown, the certainty of escaping from a partial local minimum cannot be guaranteed when an energy jump level is predetermined. Furthermore, there is no parallelism between the function of organisms and a temporal energy jump.

SUMMARY OF THE INVENTION

The present invention is invented so as to solve the above problems of the prior art and has an object to provide a data processing system and an adaptation method therefor, free from the problem of falling into local minimum during the learning process.

The present invention provides an adaptation method of a data processing system according to the present invention is characterized in that;

a threshold of a neuron which has output a significant output at a point of time is compulsorily increased once to a maximal value, then decreased to the value at the point of time and a fixed input is given to data processing system;

the weight is adjusted during the above compulsory change of threshold.

The present invention also provides an adaptation method of a data processing system according to the present invention, wherein;

a threshold of a neuron which has outputted a significant output at a point of time is compulsorily increased once to a maximal value, then decreased to the value at the point of time and a fixed input is given to the data processing system, and the weight is adjusted during the above compulsory change of threshold, characterized in that the threshold distribution of the data processing system has a smooth inclination at the initial condition.

An executing method for adaptation of data processing system relates to the present invention has a structure of:

1) Giving certain inputs to the data processing system, a weight of a neuron which generated a useful output on a point is increased to the value on the point after once decreased to minimum value;

2) The weight is arranged during the minimum value.

3) An incline of gentle slope is given to threshold distribution of neurons in the initial state;

4) Giving a certain input to the data processing system, a weight of a neuron which generated a useful output on a point is increased to the value on the point after once having been decreased to minimum value;

5) The weight is arranged during the minimum value.

According to the adaptation method of a data processing system of the present invention, it is possible to escape certainly from a local minimum by a mechanism having parallelism with the function of organisms.

BRIEF DESCRIPTION OF THE DRAWING

FIG. 35 shows a diagram of the 6th embodiment in addition to FIG. 19 of the initial threshold distribution.

FIG. 36 shows a diagram of the 7th embodiment in addition to FIG. 19 of the initial threshold distribution.

FIG. 37 shows a diagram of the 8th embodiment in addition to FIG. 19 of the initial threshold distribution.

PREFERRED EMBODIMENT OF THE PRESENT INVENTION

Hereafter, preferred embodiments of the present invention are described with reference to the attached drawings.

Here, the standard identification ratio TP is defined as an index for indicating the effect of learning as follows:

$$TP = \frac{\sum_{i<j}^{n} P_{i,j}^2}{n}$$

where, n: number of input phenomena;

i, j: input phenomenon number

Pi, j: identification ratio (number of bits identified) of neural network output of ith and jth input phenomena.

Figure 1:
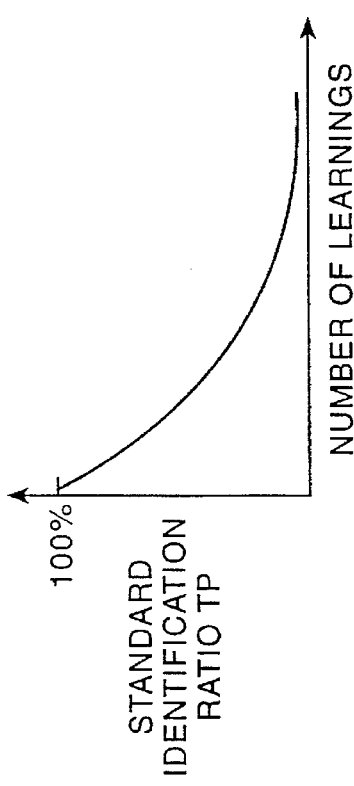
FIG. 1 shows a graph describing of the change of standard identification ratio when appropriate learning is performed.

The above standard identification ratio TP is an index of recognition ability for input phenomenon of neural network. The lower the TP is, the higher the recognition ability is. In general, TP=100% for a neural network that has not been trained for any leanings. TP monotonously decreases as learning advances.(FIG. 1)

Figure 2:
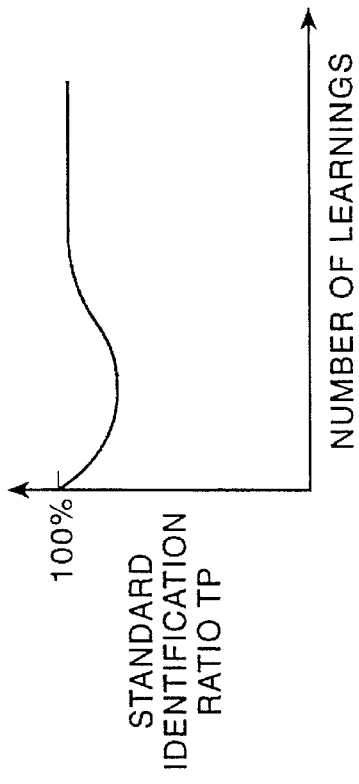
FIG. 2 shows a graph describing of the change of standard identification ratio when inappropriate learning is performed.

However, the learning effect may be deteriorated conversely, when the learning method is inappropriate causing an increase of TP that has once been dropped, as shown in FIG. 2.

Figure 3:
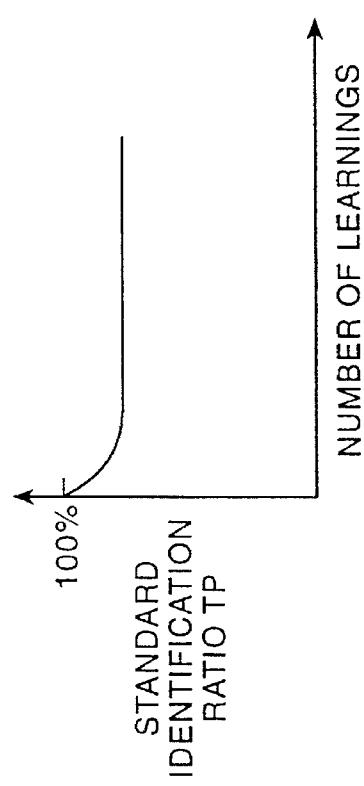
FIG. 3 shows a graph describing of the change of standard identification ratio when dropping to partial local minimal occurred on learning process.
Figure 5:
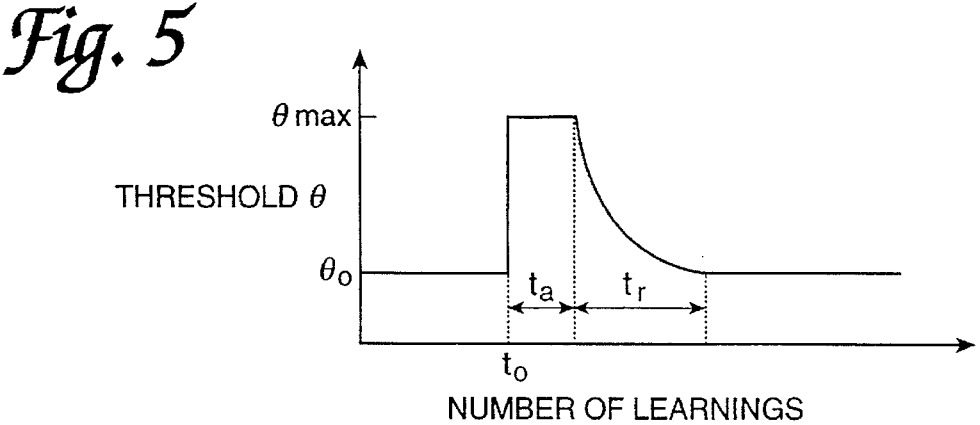
FIG. 5 shows a graph of the 1st embodiment of threshold change according to the present invention method.

As mentioned above, TP is saturated at a high value when falling into local minimum occurs, as shown in FIG. 3.

Figure 4:
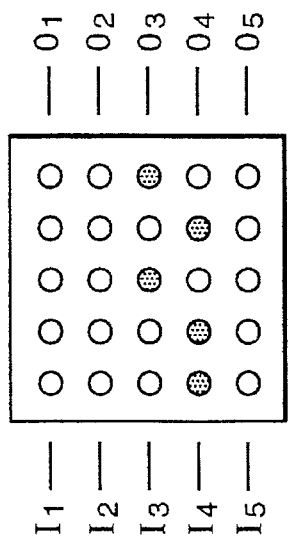
FIG. 4 shows a schematic diagram of embodiment of ignition pattern for neural network when it drops to partial local minimal.

This falling into local minimum has nothing to do with said energy formula(1), and can be considered as the result of learning which strengthens a characteristics of a phenomenon corresponding to a weight distribution with steep deviations. It causes confusion among a plurality of phenomena. This is typically described as shown in FIG. 4, in which ignition distribution of neurons is inclined due to strong influence of a input but I4, and it becomes difficult for other neurons to ignite because this condition is strengthened. Here, ignited neurons are shown by black circle in this figure.

In order to improve such conditions, it is necessary to strengthen the participation of neurons with respect to other input bits I1 to I3 and I5.

Here, the inventors of the present invention noticed an absolute and relative refractory period of organism neural network. It is said that these refractory period contribute to restraint and control of stimulation transmissions, according to organism neural network. (Written by Shunichi Amari: A mathematical principal of neural network—information processing manner of neural network-; Sangyo Tosho)

Contrary to the above, the inventors considered these refractory periods to be factors for changing temporarily the balance of influence for each characteristics of input data, and give change to the threshold of a neuron that ignites for a certain input so as to obtain equivalent effect to absolute and relative refractory period.

Figure 38:
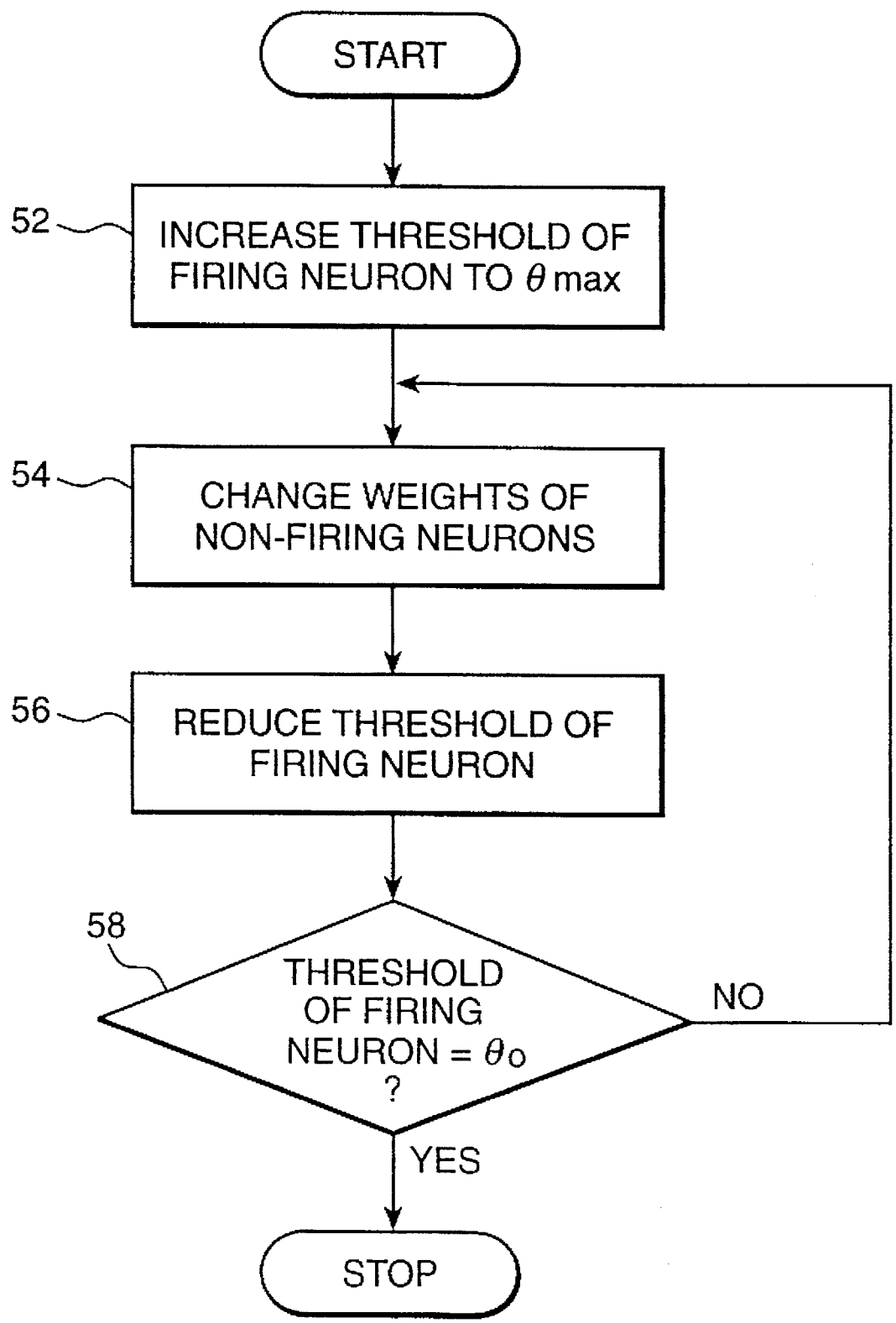
FIG. 38 shows a flow diagram of the adaptation method of the present invention.

Accordingly, as shown in FIG. 38, the threshold $\theta$ of a neuron which has associatively ignited at a point of time "to" on learning process is raised to the maximal value $\theta$ max (for example, to the infinite) in step 52 for a predetermined period "ta" after the ignition. This corresponds to absolute refractory period. During the absolute refractory period, learning is continued and weight of neuron is changed. Here, as shown in step 54, that neuron whose weight is to be changed is the neuron which does not ignite for the input before "to". After the period "ta", the threshold is gradually decreased in steps 56 and 58 to value $\theta_o$ at "to". This period of gradual decrease corresponds to relative refractory period and is expressed by "tr".

As for the absolute refractory period, weight is strengthen for only that neuron which did not ignite at "to" and learning for modification of deviated neuron distribution is performed. On the other hand, in the relative refractory period, balanced amendment learning for total neural network is performed, gradually, with igniting neurons that fired at "to".

As the result, escape from local minimum is realized, and learning is performed to lead standard identification ratio to optimized value (global minimum).

Figure 6:
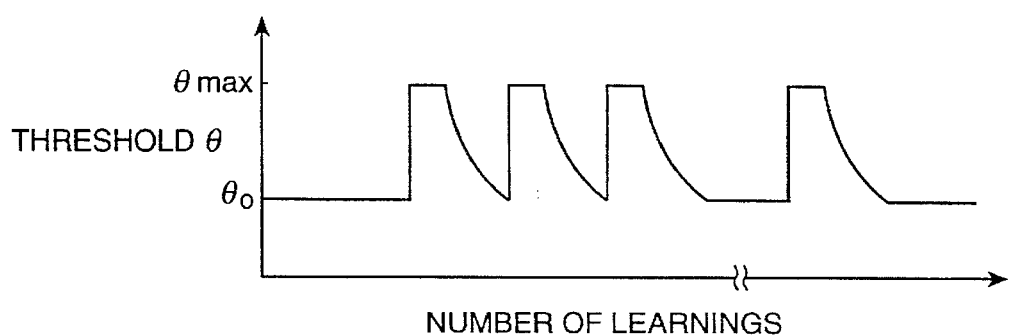
FIG. 6 shows a graph of the 2nd embodiment of threshold change according to the present invention method.

As shown in FIG. 6 of embodiment 2, it is effective for escaping from a local minimum to give repetitive changes of the threshold during the refractory period. However, convergence of learning may obstructed, conversely, when too many repetitive changes occur, or when repetitive changes are given toward the end of learning. Therefore, repetitive changes shall be given for appropriate number of times at a rather initial period of learning. Furthermore, optimization for period "ta" of absolute refractory period, period "ta" of relative refractory period, and relationship therebetween shall be optimized.

Figure 7:
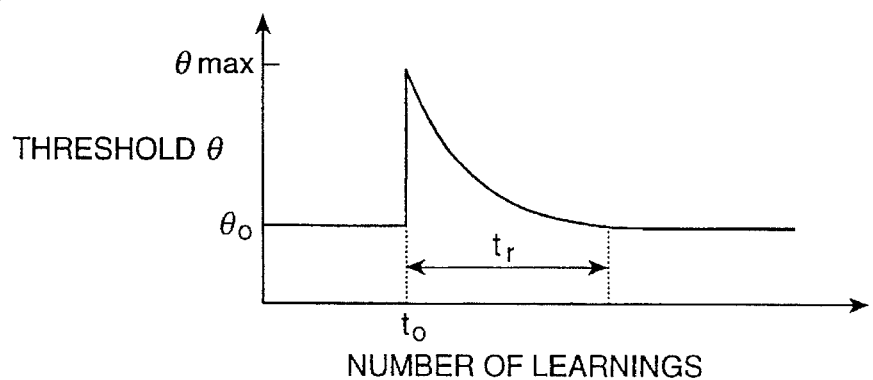
FIG. 7 shows a graph of the 3nd embodiment of threshold change according to the present invention method.

FIG. 7 shows the threshold change according to the 3rd embodiment. As for this embodiment, relative refractory period is prepared, whereas absolute refractory period does not exist. That is, threshold $\theta$ is first changed to the maximal value $\theta$ max for a period of "to", then gradually decreases to the original value $\theta_o$ during the period "ta". As for this embodiment, it is possible to complete learning fast due to absence of absolute refractory period, when there is no steep incline in neurons ignition distribution.

Figure 8:
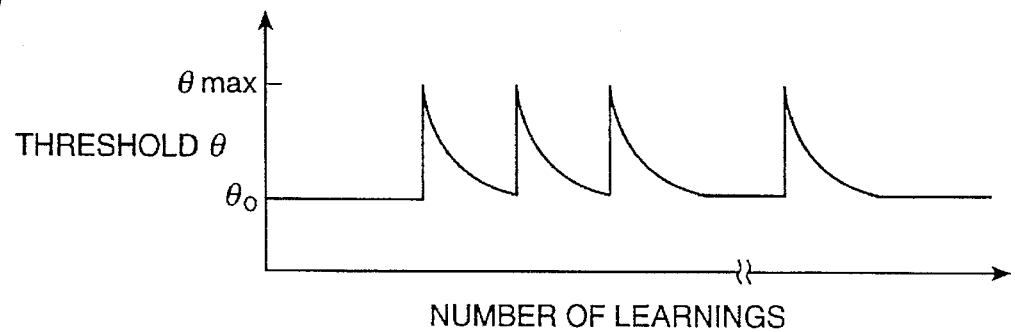
FIG. 8 shows a graph of the 4th embodiment of threshold change according to the present invention method.

FIG. 8 shows the threshold change according to the 4th embodiment. As for this embodiment, a plurality of refractory periods are repeatedly given, each of which is similar to that in FIG. 7.

Figure 9:
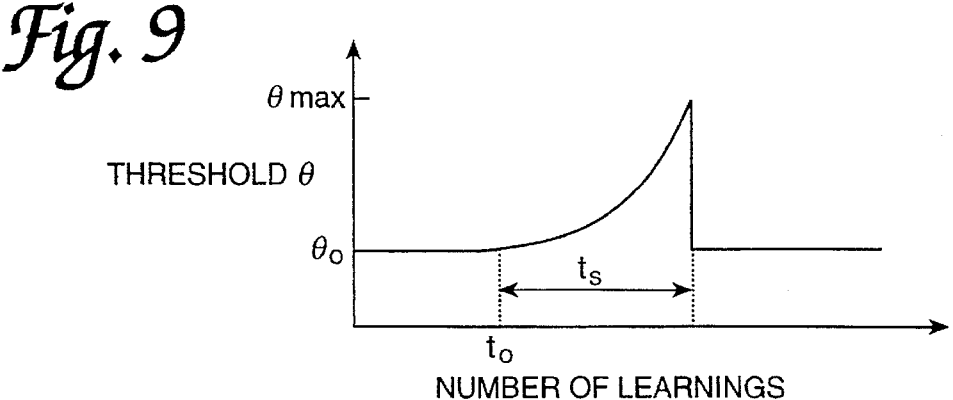
FIG. 9 shows a graph of the 5th embodiment of threshold change according to the present invention method.

FIG. 9 shows the threshold change according to the 5th embodiment. As for this embodiment, only relative refractory period is prepared in which threshold gradually increases. That is, threshold gradually increases during the period "ts" from a point "to". Once threshold reaches to the maximal value θ max, it immediately returns to the original value $θ_o$. In view of above embodiment, balanced learning for improvement of total neural network can be expected.

Figure 10:
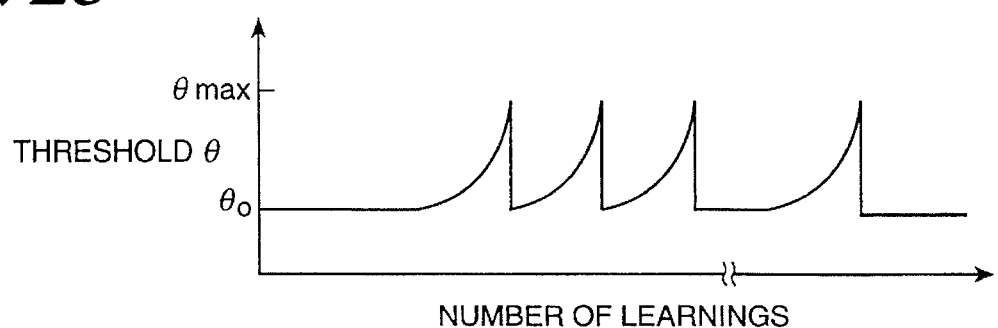
FIG. 10 shows a graph of the 6th embodiment of threshold change according to the present invention method.

FIG. 10 shows the threshold change according to the 6th embodiment. As for this embodiment, a plurality of cycles of relative refractory periods are given, each of which is similar to that in FIG. 9.

Figure 11:
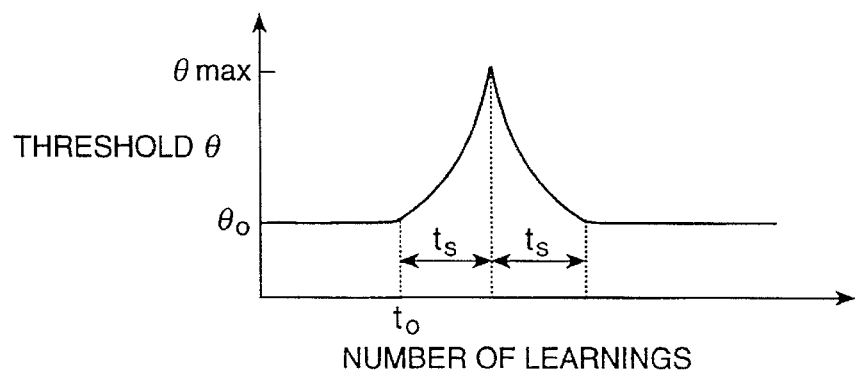
FIG. 11 shows a graph of the 7th embodiment of threshold change according to the present invention method.

FIG. 11 shows the threshold change according to the 7th embodiment. As for this embodiment, both relative refractory period are prepared, in which threshold gradually increases and decreases. That is, threshold gradually increases during the period "ts" from the point "to". Once threshold reaches to the maximal value θ max, it immediately returns to the original value $θ_o$. The same effect as that of the above embodiments can be expected.

Figure 12:
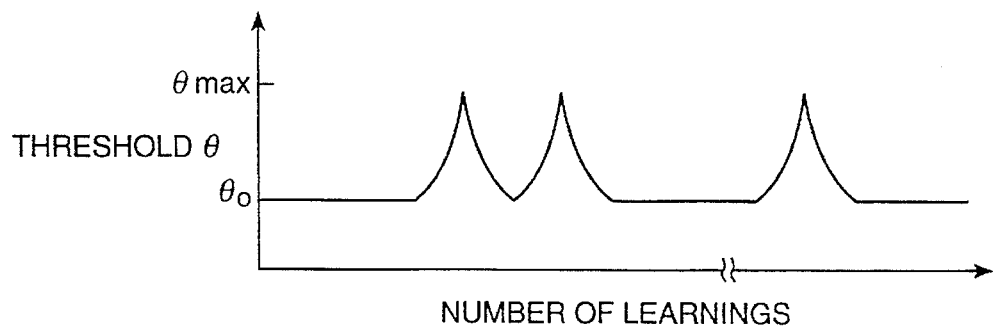
FIG. 12 shows a graph of the 8th embodiment of threshold change according to the present invention method.

FIG. 12 shows the threshold change according to the 8th embodiment. As for this embodiment, the relative refractory period shown in FIG. 11 is repeatedly occurs.

Figure 13:
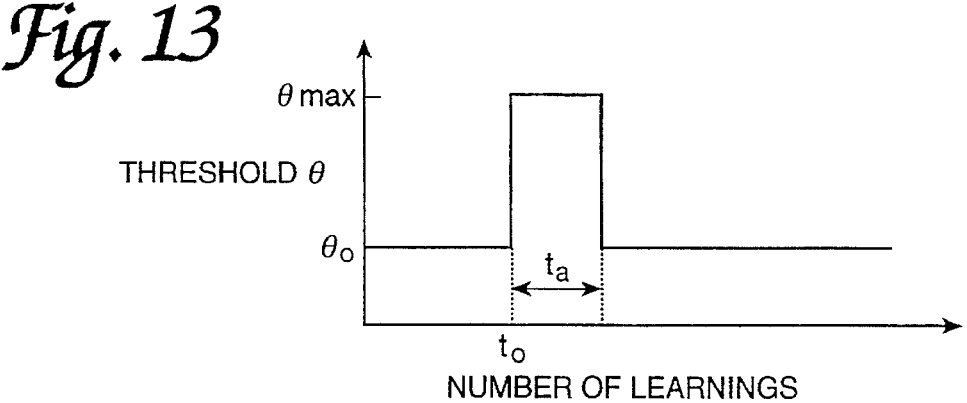
FIG. 13 shows a graph of the 9th embodiment of threshold change according to the present invention method.

FIG. 13 shows the threshold change according to the 9th embodiment. As for this embodiment, only absolute refractory period is prepared, where as relative refractory period is not. That is, threshold has the maximal value θ max during the period ta from the point to, then returns to the original value $θ_o$. In this embodiment, balanced amendment learning for total neural network is performed in a short period of time.

Figure 14:
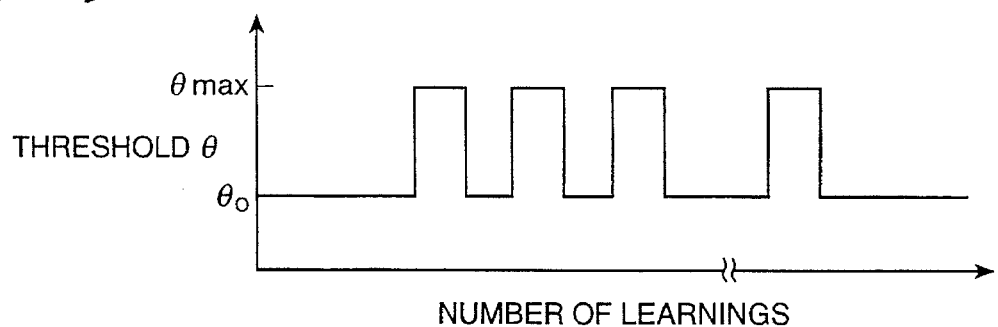
FIG. 14 shows a graph of the 10th embodiment of threshold change according to the present invention method.

FIG. 14 shows the threshold change according to the 10th embodiment. As for this embodiment, absolute refractory period described in FIG. 13 occurs repeatedly.

Figure 15:
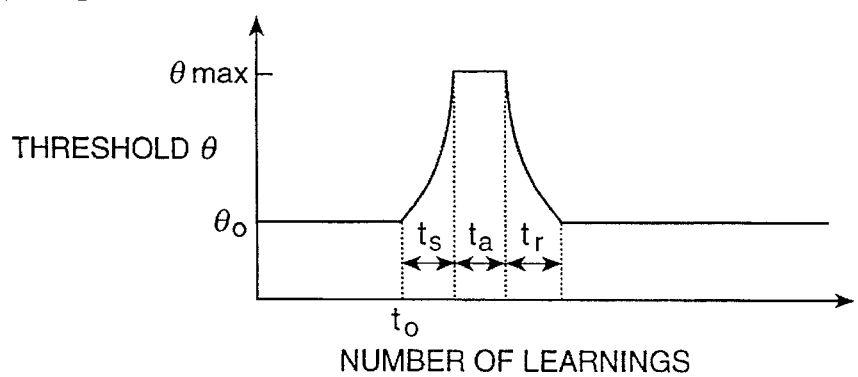
FIG. 15 shows a graph of the 11th embodiment of threshold change according to the present invention method.

FIG. 15 shows the threshold change according to the 11th embodiment. As for this embodiment, relative refractory period, absolute refractory period in which threshold gradually increases, and relative refractory period in which threshold gradually decreases are prepared. That is, threshold gradually increases to the maximal value θ max during the period of "ts" from the point "to", and the maximal value θ max is maintained during the period "to", then gradually decreases to original value $θ_o$ during the period "tr". In view of above embodiment, balanced amendment learning for total neural network is possible.

Figure 16:
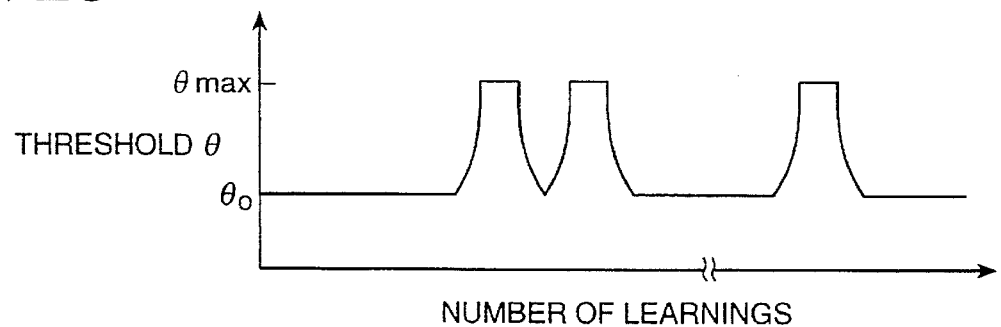
FIG. 16 shows a graph of the 12th embodiment of threshold change according to the present invention method.

FIG. 16 shows the threshold change according to the 12th embodiment. As for this embodiment, refractory period as it is described in FIG. 15 is repeatedly performed.

As mentioned above, the adaptation method of data processing according to the present invention has outstanding effect of escaping from partial local minimal for certain as following steps;

a threshold of neuron generating significant output at certain point is compulsorily changed to increase once to maximal value, then decreases to the value at said point;

a predetermined weight is adjusted during the above compulsory change of threshold in other neurons that did not output during that certain point.

Figure 17:
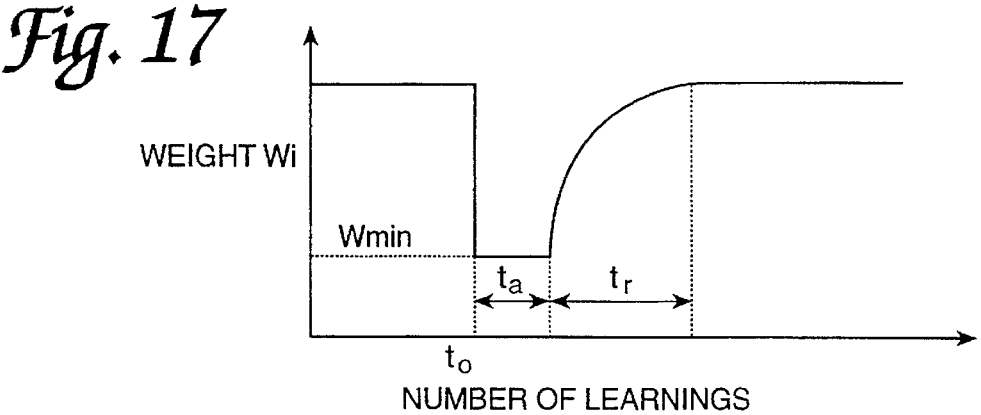
FIG. 17 shows a diagram of the weight change by the 13th embodiment of the present invention.
Figure 18:
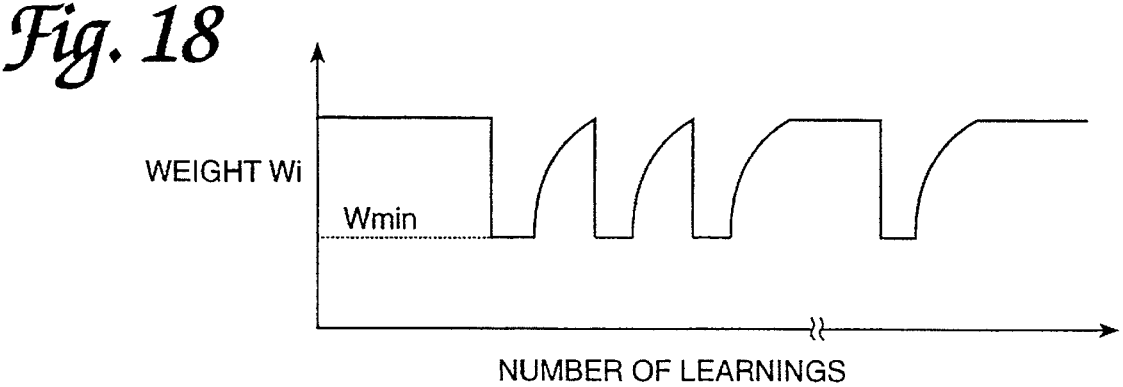
FIG. 18 shows a diagram of weight change by the 14th embodiment.

In the embodiments above, an effect equivalent to refractory period is obtained by changing the threshold. A similar effect can be occurred by that weights W1 to Wn of a neuron which fire at a point of time "to" are decreased to the minimum Wmin, for example "0". FIG. 17 shows the 13th embodiment of this type.

As shown in FIG. 6, it is more certain to get out of a local minimum by giving a cycle of weight change. When the number of repetitions of weight change is too many, the convergence of learning is impeded. The convergence of learning is impeded, also when the cycle of weight change is given on the end period of learning.

Namely, the cycle of weight change is to be given appropriate number in the initial term of learning.

In addition to the above, adaptation is to be considered as to absolute refractory period of "ta", relative refractory period of "tr" and the balance of both periods.

Figure 19:
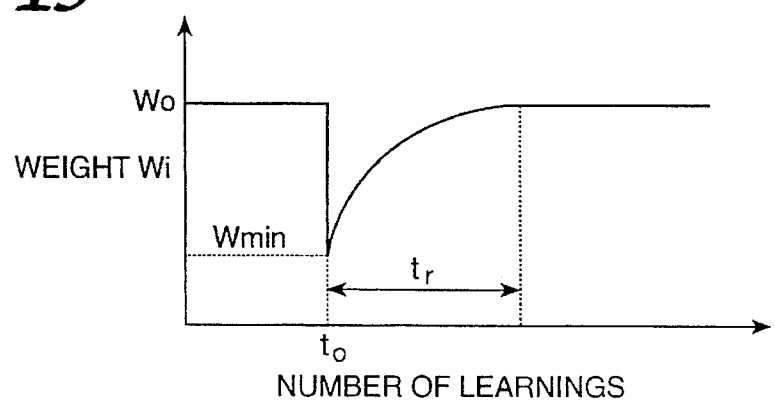
FIG. 19 shows a diagram of weight change by the 15th embodiment.

FIG. 19 shows the weight change in the fifteenth embodiment. In this embodiment, absolute refractory period is not settled but only the relative refractory period is settled. After weight wi takes the minimum value Wmin on "to", it immediately increases gradually to the beginning value wo during the period "tr". By the third embodiment, learning can be completed earlier because of absence of absolute refractory period, when there is no steep inclination of the distribution of neurons ignition distribution.

Figure 20:
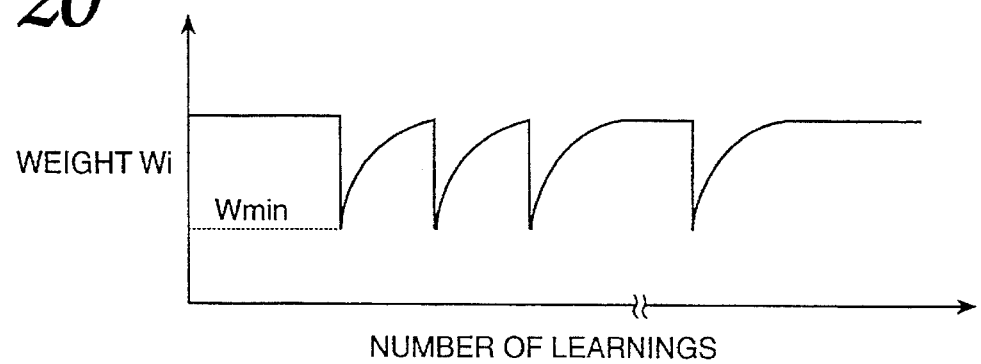
FIG. 20 shows a diagram of weight change by the 16th embodiment.

FIG. 20 shows the weight change in the sixteenth embodiment. In this embodiment, the cycle of relative refractory periods only as in FIG. 19 is given plural times.

Figure 21:
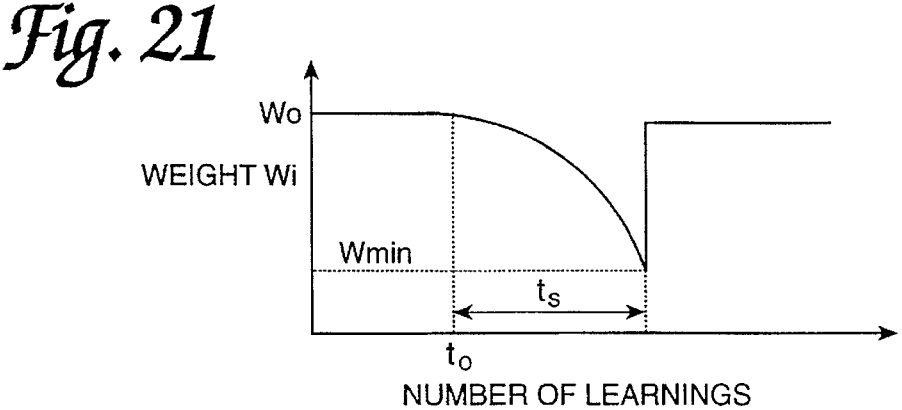
FIG. 21 shows a diagram of weight change by the 17th embodiment.

FIG. 21 shows the weight change of the seventeenth embodiment. In this embodiment, only relative refractory period is settled in which weight gradually decreases. The weight gradually decreases to reach the minimum value Wmin from "to" during the period "ts", then immediately increases to the beginning value wo. Balanced corrective learning is expected for whole of neural network by this embodiment.

Figure 22:
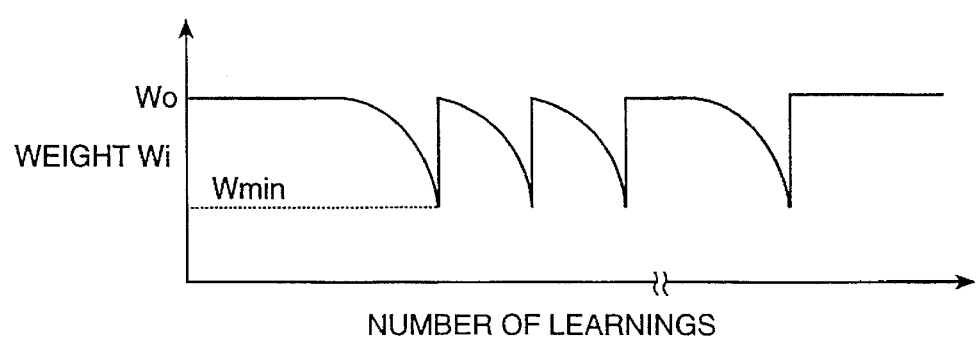
FIG. 22 shows a diagram of weight change by the 18th embodiment.

FIG. 22 shows the weight change of the eighteenth embodiment. In this embodiment, the cycle of only relative refractory period is given in which weight gradually decreases as shown in FIG. 9 plural times.

Figure 23:
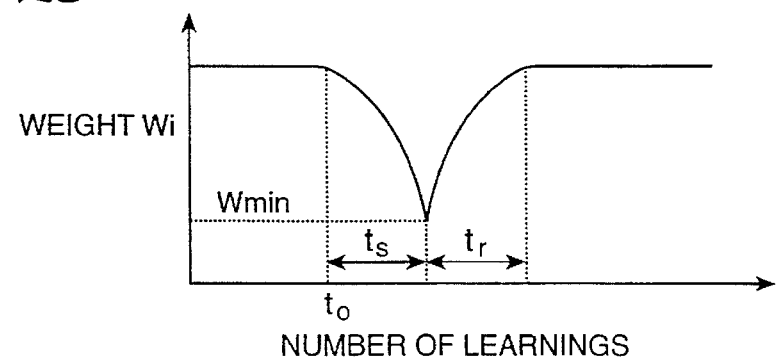
FIG. 23 shows a diagram of weight change by the 19th embodiment.

FIG. 23 shows the weight change of the nineteenth embodiment. In this embodiment, two patterns of the relative refractory periods are settled in which weight gradually decreases and in which weight gradually increases. The weight gradually decreases to reach the minimum value Wmin from "to" during the period "ts", then immediately increases to the original value wo increasing gradually during the period "tr". This embodiment is also expected the same effectiveness of each embodiment above.

Figure 24:
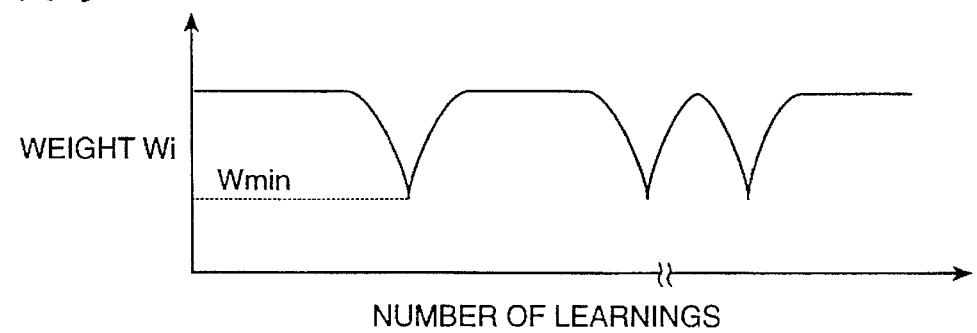
FIG. 24 shows a diagram of weight change by the 20th embodiment.

FIG. 24 shows the weight change of the twentieth embodiment. In this embodiment, two patterns of the relative refractory periods are repeated in which weight gradually decreases and in which weight gradually increases as shown in FIG. 13.

Figure 25:
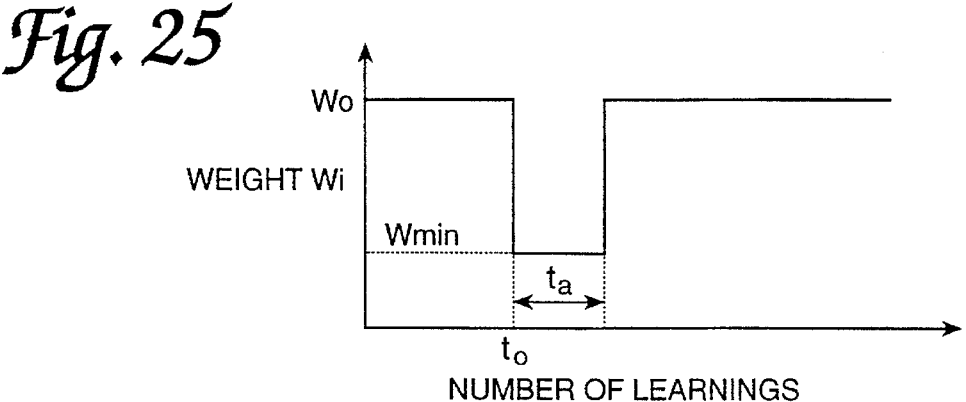
FIG. 25 shows a diagram of weight change by the 21th embodiment.

FIG. 25 shows the weight change of the twenty-first embodiment. In this embodiment, relative refractory period is not settled but only absolute refractory period is settled. The weight value is the minimum Wmin from "to" during the period "ta", and returns to the original value wo Balanced corrective learning for whole neural network is possible in short time by the present embodiment, too.

Figure 26:
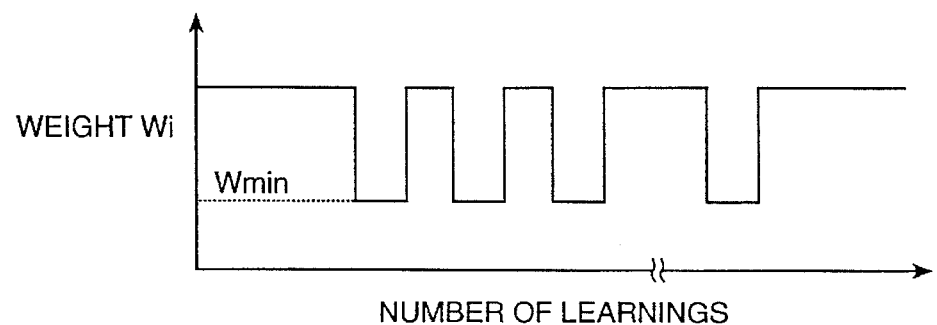
FIG. 26 shows a diagram of weight change by the 22th embodiment.

FIG. 26 shows the weight change of the twenty-second embodiment. In this embodiment, absolute refractory period shown in FIG. 13 is repeated.

Figure 27:
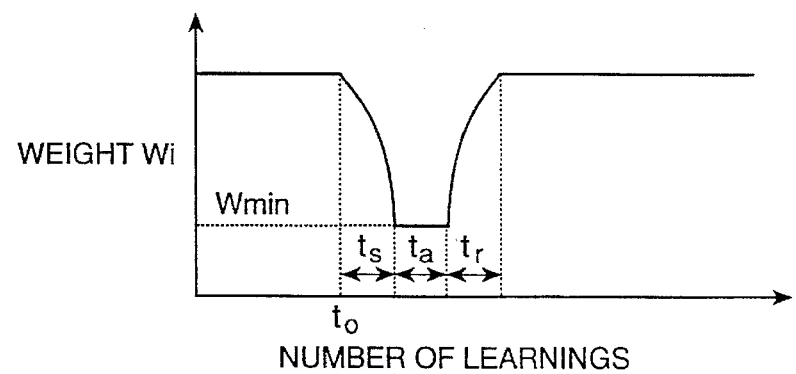
FIG. 27 shows a diagram of weight change by the 23th embodiment.

FIG. 27 shows the weight change of the twenty-third embodiment. In this embodiment, three patterns of periods are settled: relative refractory period in which weight gradually decreases, absolute refractory period, and relative refractory period in which weight gradually increases. Weight value reaches the minimum Wmin decreasing gradually during the period "ts"; it keeps the minimum Wmin during the period "to"; and it returns the original value wo increasing gradually during the period "tr". Balanced corrective learning for whole neural network is possible by the present embodiment, too.

Figure 28:
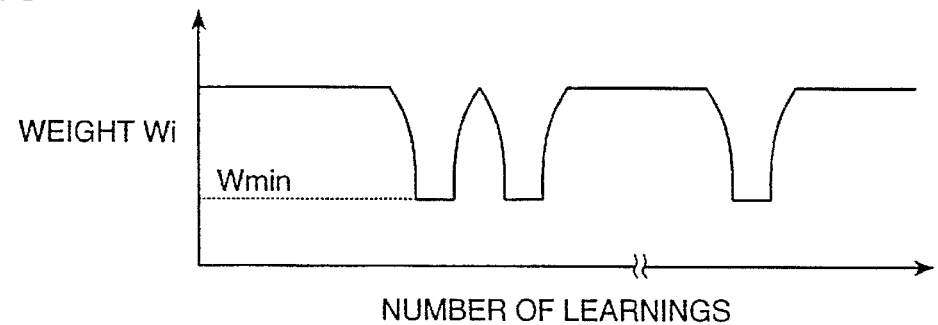
FIG. 28 shows a diagram of weight change by the 24th embodiment.

FIG. 28 shows the weight change of the twenty-fourth embodiment. In this embodiment, the cycle of refractory period shown in FIG. 27 is repeated.

As mentioned above, an adaptation method of data processing system according to the present invention has superior effectiveness to get out of the local minimum certainly because of the steps of:

a) Giving certain inputs to the data processing system, whereby a weight of neuron generated a useful output on a point is increased to the value on said point after once being decreased to minimum value;

b) The weight of other neurons not having useful outputs at said point are—and after "value" insert—of the weight of neuron which generated the useful value arranged during the minimum value.

It is described below the adaptive method to be executed in the beginning of learning so as to the adaptive method to be more effective one.

Figure 29:
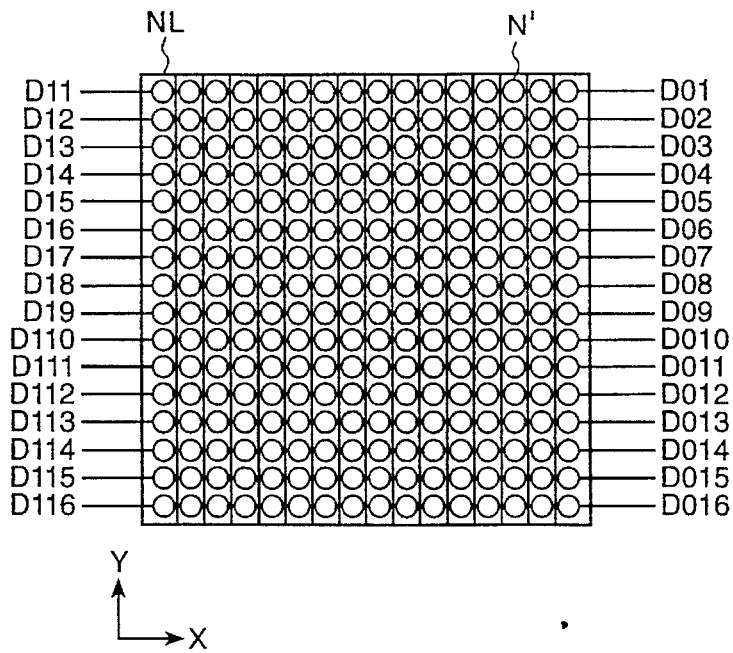
FIG. 29 is a diagram to show the structure of data processing system.

In FIG. 29, a data processing system comprises plural neural layer NL in which plural neurons N are settled parallelly. The neural layer has the structure that the output of a neural layer becomes the input of the neural layer in the next stage.

The topology of a neural network can be defined in such a structure. The coordinate of each neuron can be specified as shown in FIG. 29.

Figure 30:
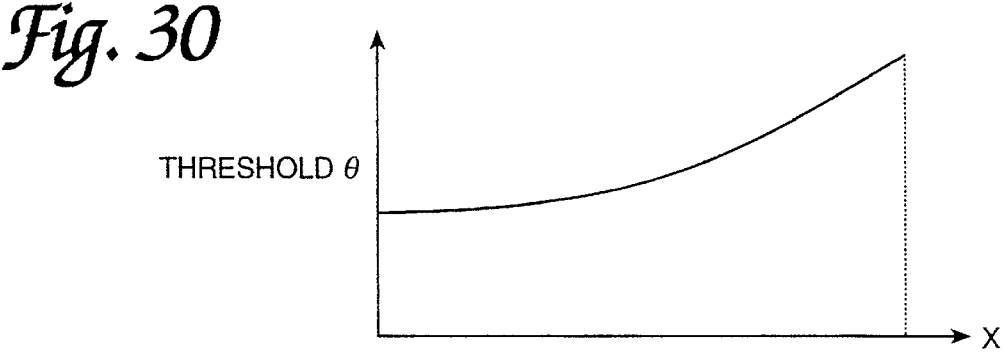
FIG. 30 shows a diagram of an embodiment of the initial threshold distribution.

Here, the topology conditions are described below. The X-axis is settled in the direction from the input to the output and Y-axis is settled along the longitudinal direction of each neural layer. The initial threshold distribution of neurons is settled as shown in FIG. 30. In the distribution, neurons in the same layer have the same value, and the value increases as the X coordinate increases. The inclination of threshold's increase is smooth. During the learning process, a weight of a synapse transmitting significant output is increased when valid or correct data is input to a neural network.

As to threshold distribution in FIG. 30, only the neurons in the input side ignite first and gradually the ignition is spread out to the neurons of subsequent layers in later steps. On this process, introducing the process of minimizing a weight, it is effective to increase the neurons to be ignited corresponding to a certain input in each neural layer. On the point that neural layer in the last step is ignited, many neurons contribute data processing and ignition pattern does not incline. Therefore, it is possible to prevent falling into local minimum.

Figure 31:
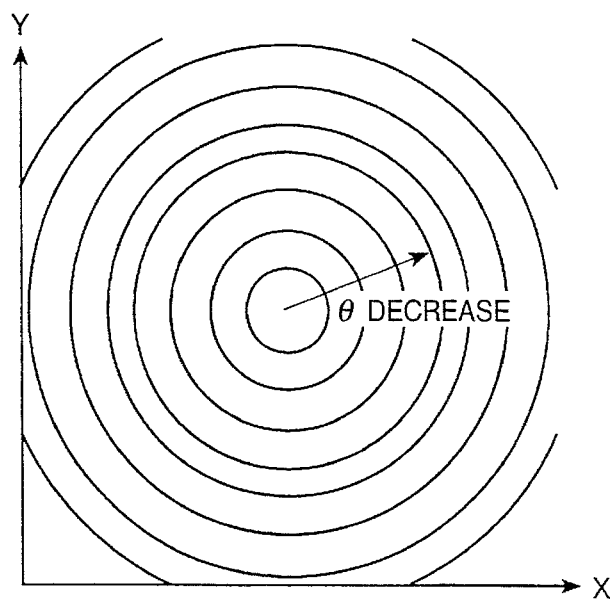
FIG. 31 shows a diagram of the 2nd embodiment of the initial threshold distribution.

FIG. 31 shows another embodiment of the initial threshold distribution. The threshold of neurons in the center of data processing system is large. As departing from the center of the data processing system, the threshold becomes smaller. Ignition pattern, referred to as a "threshold mountain", is generated around the base of the mountain of threshold at the beginning of learning. When threshold is changed to be maximum, the distribution of ignited neuron is spread gradually toward the center or the top of threshold mountain because of the existence of the neurons with rather lower threshold adjacent to igniting neuron. Through the processing, many neurons contribute data processing at the end of learning and ignition pattern does not incline. Therefor, it is possible to prevent a cave into local minimum.

Figure 32:
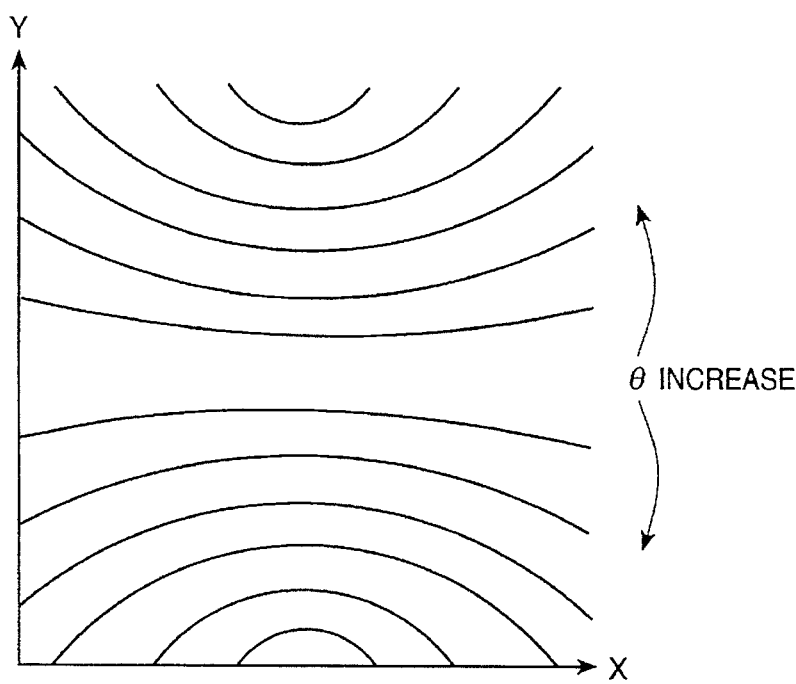
FIG. 32 shows a diagram of the 3rd embodiment in addition to FIG. 19 of the initial threshold distribution.

FIG. 32 shows another embodiment of the initial threshold distribution in addition to FIG. 31. The neuron's threshold at the middle of Y-axis is settled to be the minimum. It becomes larger toward the maximum and minimum of Y-axis with smooth inclination. The ignition pattern passing through or beside the middle of Y-axis is generated first in such a data processing system. When threshold is changed to be maximum of the middle of the Y-axis, the distribution of igniting neurons is spread gradually toward both of the maximum and minimum of Y-axis because of the existence of the neurons with rather lower threshold adjacent to neurons igniting. Through the processing, many neurons finally contribute data processing and ignition pattern becomes flat. Therefore, it is possible to prevent the falling into local minimum.

Figure 33:
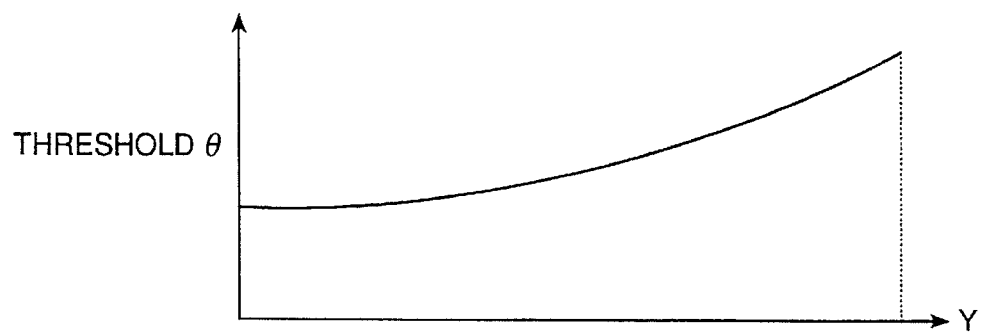
FIG. 33 shows a diagram of the 4th embodiment in addition FIG. 19 of the initial threshold distribution.

FIG. 33 shows the 4th embodiment. In this embodiment, unlike the 1st embodiment in FIG. 30, thresholds for neurons in the same Y coordinate are equal for each neural layer, whereas threshold of neuron is heightened as Y coordinate increases with respect to the same neural layer. Here, the inclination on threshold's increase is smooth. As to threshold distribution in FIG. 33, only neurons larger in Y coordinate ignite first and gradually the ignition is spread out to the neurons smaller in Y coordinate. When maximization of threshold is performed, the distribution of igniting neurons is spread gradually because of the existence of the neurons with rather lower threshold adjacent to neurons igniting. Through the processing, many neurons finally contribute data processing and ignition pattern becomes flat. Therefore, it is possible to prevent the falling into local minimum.

Figure 34:
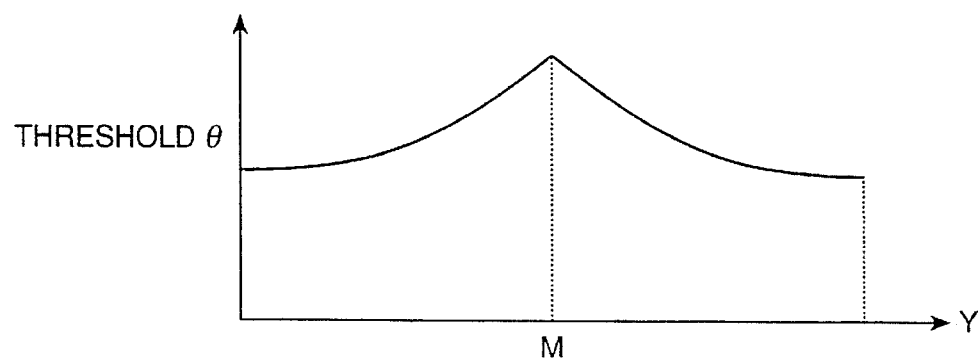
FIG. 34 shows a diagram of the 5th embodiment in addition to FIG. 19 of the initial threshold distribution.

FIG. 34 shows the 5th embodiment, thresholds for neurons of all neural layer in the same Y coordinate are equal, whereas threshold in the specific Y coordinate M (center, for example) is the maximum and decreases gradually as departing from the center. As to threshold distribution in FIG. 34, only neurons at the maximum and minimum value side with respect to Y coordinate ignite first and gradually the ignition is spread out to the center. When maximization of threshold is performed, the distribution of igniting neurons is spread gradually because of the existence of the neurons with rather lower threshold adjacent to neurons igniting. Through the processing, many neurons finally contribute data processing and ignition pattern becomes flat. Therefore, it is possible to prevent the falling into local minimum.

FIG. 35 shows the 6th embodiment. In this embodiment, the smaller the X and Y coordinate becomes, the smaller the threshold of neurons becomes, and the bigger the X and Y coordinate becomes, the smoother the threshold of neurons decreases. As to this threshold distribution, only neurons at small X and Y coordinate ignite first and gradually the ignition is spread out to the neurons at bigger end of X and Y coordinate. When maximization of threshold is performed, the distribution of igniting neurons is spread gradually because of the existence of the neurons with rather lower threshold adjacent to neurons igniting. Through the processing, many neurons finally contribute data processing and ignition pattern becomes flat. Therefore, it is possible to prevent the falling into local minimum.

FIG. 36 shows the 7th embodiment of the initial threshold distribution. Threshold of center neuron is settled to the minimum. It increases as it becomes more distant from above center neuron. The ignition pattern is generated from center neuron at the beginning of learning. When maximization of threshold is performed, the distribution of igniting neurons is spread gradually because of the existence of the neurons with rather lower threshold adjacent to neurons igniting. Through the processing, many neurons finally contribute data processing and ignition pattern becomes flat. Therefore, it is possible to prevent the falling into local minimum.

FIG. 37 shows the 8th embodiment of the initial threshold distribution. Threshold, for example, becomes bigger as it approaches to the center in Y coordinate, whereas it, for example, becomes smaller as it approaches to the center in X coordinate. That is, the shape of threshold distribution is like a saddle.

The similar effect of the above each embodiment can be obtained by the present embodiment, too.

As to a data processing system according to the present invention, igniting neuron is spread during the learning, for modifying the inclination so as to give the smooth inclination to initial threshold distribution. As the result, it is possible to prevent inclined ignition pattern.

What is claimed is:

1. A method for maximizing an efficiency of a data processing system receiving training data, said method comprising the steps of:

inputting said training data to said system, said system comprising a neural network having a plurality of neurons each of which is capable of outputting a signal when a weighted sum of inputs has a predetermined relationship to a threshold;

determining a first neuron which outputs a signal in response to said training data, and compulsorily increasing a threshold of said first neuron up to a maximum value;

determining a second neuron which did not output a signal in response to said training data, and adapting weights of said second neuron so that weights to be multiplied to inputs of the second neuron are increased when said threshold of said first neuron is increased; and decreasing said threshold of said first neuron after adapting said weights of said second neuron, thereby adapting said neural network to provide an even ignition pattern without generating a local minimum.

2. A method for maximizing an efficiency of a data processing system receiving training data, said method comprising the steps of:

inputting said training data to said system, said system comprising a neural network having a plurality of neurons each of which is capable of outputting a signal when a weighted sum of inputs has a predetermined relationship to a threshold;

determining a first neuron which outputs a signal in response to said training data, and decreasing a weight of said first neuron, said weight being compulsorily decreased to a minimum value;

determining a second neuron which did not output a signal in response to said training data, and adapting weights of said second neuron so that weights to be multiplied to inputs of the second neuron are decreased when said weight of said first neuron is decreased; and increasing said weight of said first neuron after adapting said weights of said second neuron, thereby adapting said neural network to provide an even ignition pattern without generating a local minimum.

3. The method of claim 1 or 2, wherein said steps are performed a plurality of times repeatedly.

4. The method of claim 1, wherein said threshold is changed so as to obtain an effect equivalent to an absolute refractory period.

5. The method of claim 1, wherein said threshold is changed so as to obtain an effect equivalent to a relative refractory period.

6. The method of claim 1, wherein said threshold is changed so as to obtain an effect equivalent to both absolute and relative refractory periods.

7. The method of claim 5 or 6, wherein said relative refractory period consists of an increasing period and decreasing period of threshold.

8. The method of claim 2, wherein said weight is changed so as to obtain an effect equivalent to an absolute refractory period.

9. The method of claim 2, wherein said weight is changed so as to obtain an effect equivalent to a relative refractory period.

10. The method of claim 2, wherein said weight is changed so as to obtain an effect equivalent to both absolute and relative refractory periods.

11. The method of claim 9 or 10, wherein said relative refractory period consists of an increasing period and decreasing period of weight.

12. The method of claim 1 or 2, wherein a smooth inclination is given to said threshold distribution at an initial condition.

13. The method of claim 12, wherein said threshold increases from an input side to an output side in said data processing system.

14. The method of claim 12, wherein said threshold decreases from a center portion to a peripheral portion of said data processing system.

15. The method of claim 12, wherein said threshold increases from a middle portion to both sides in a lateral direction of said data processing system.

16. The method of claim 12, wherein said threshold increases from a center portion to peripheral portion of said data processing system.

17. The method of claim 12, wherein said threshold increases laterally from one side to another side of said data processing system.

18. The method of claim 12, wherein said threshold decreases from a middle portion to both sides in a lateral direction of said data processing system.

19. The method of claim 12, wherein said threshold increases from one end of an input side to an opposite end of an output side.

20. The method of claim 12, wherein said threshold has saddle-like distribution with center line passing along lateral direction through a center portion of said data processing system.

21. A method for converting an untrained neural network into a trained neural network comprising the steps of:

inputting a first training signal into a data processing system having first and second neurons, said first neuron receiving the first training signal and said second neuron receiving an output from the first neuron, each neuron being capable of generating an output signal when a weighted sum of inputs has a predetermined relationship to a threshold;

increasing a threshold of the first neuron to a compulsory level when the first neuron ignites;

inputting a second training signal into the data processing system;

adapting a weight of the second neuron in response to the second training signal and in response to the output produced by the first neuron at a time when the threshold of the first neuron is at the compulsory level;

decreasing the threshold of the first neuron, thereby generating a trained neural network in the data processing system.

* * * * *